United States Patent
Zhang et al.

(10) Patent No.: US 12,212,389 B2
(45) Date of Patent: Jan. 28, 2025

(54) RADIO LINK MONITORING IN NETWORKS WITH BEAM-SPECIFIC BANDWIDTH PARTS

(71) Applicant: Apple Inc., Cupertino, CA (US)

(72) Inventors: Yushu Zhang, Beijing (CN); Chunxuan Ye, San Diego, CA (US); Weidong Yang, San Diego, CA (US); Sigen Ye, Whitehouse Station, NJ (US); Oghenekome Oteri, San Diego, CA (US); Wei Zeng, Saratoga, CA (US); Dawei Zhang, Saratoga, CA (US); Huaning Niu, San Jose, CA (US); Haitong Sun, Cupertino, CA (US); Hong He, San Jose, CA (US); Chunhai Yao, Beijing (CN); Jie Cui, San Jose, CA (US)

(73) Assignee: Apple Inc., Cupertino, CA (US)

( * ) Notice: Subject to any disclaimer, the term of this patent is extended or adjusted under 35 U.S.C. 154(b) by 67 days.

(21) Appl. No.: 17/442,543

(22) PCT Filed: Sep. 14, 2021

(86) PCT No.: PCT/US2021/050253
§ 371 (c)(1),
(2) Date: Sep. 23, 2021

(87) PCT Pub. No.: WO2022/081287
PCT Pub. Date: Apr. 21, 2022

(65) Prior Publication Data
US 2023/0109920 A1    Apr. 13, 2023

(51) Int. Cl.
*H04B 7/06*    (2006.01)
*H04L 5/00*    (2006.01)

(52) U.S. Cl.
CPC .......... *H04B 7/0617* (2013.01); *H04L 5/0005* (2013.01); *H04L 5/005* (2013.01); *H04L 5/0094* (2013.01)

(58) Field of Classification Search
CPC ...... H04L 5/0005; H04L 5/005; H04B 7/0617
(Continued)

(56) References Cited

U.S. PATENT DOCUMENTS

| | | |
|---|---|---|
| 2014/0211655 A1 | 7/2014 | Yoo et al. |
| 2019/0297514 A1 | 9/2019 | Pao et al. |

(Continued)

FOREIGN PATENT DOCUMENTS

| | | | | |
|---|---|---|---|---|
| EP | 3723425 | 10/2020 | | |
| WO | WO-2019111301 A1 * | 6/2019 | ........... | H04L 5/0048 |

(Continued)

OTHER PUBLICATIONS

International Patent Application No. PCT/US2021/050253, International Search Report and Written Opinion, Mailed on Dec. 13, 2021, 14 pages.

(Continued)

*Primary Examiner* — Leila Malek
(74) *Attorney, Agent, or Firm* — Kilpatrick Townsend & Stockton LLP

(57) ABSTRACT

The present application relates to devices and components including apparatus, systems, and methods for radio-link monitoring operations in radio networks that include beam-specific bandwidth parts.

18 Claims, 11 Drawing Sheets

(58) Field of Classification Search
USPC ............................................. 375/262
See application file for complete search history.

(56) References Cited

U.S. PATENT DOCUMENTS

| | | | |
|---|---|---|---|
| 2020/0296656 A1 | 9/2020 | Amuru et al. | |
| 2021/0227568 A1* | 7/2021 | Harada | H04L 5/0048 |
| 2022/0053590 A1* | 2/2022 | Ma | H04B 7/0695 |
| 2023/0209519 A1* | 6/2023 | Li | H04W 72/0453 |
| | | | 370/329 |

FOREIGN PATENT DOCUMENTS

| | | | |
|---|---|---|---|
| WO | 2019165224 | 8/2019 | |
| WO | WO-2021253240 A1 * | 12/2021 | ........... H04L 5/0044 |

OTHER PUBLICATIONS

Summary of 8.4.4 Other Aspects of NR-NTN, MediaTek Inc., 3GPP TSG RAN Meeting #102e, R1-2007060, Aug. 17-28, 2020, 36 pages.

3rd Generation Partnership Project; Technical Specification Group Radio Access Network; NR; Physical layer procedures for control (Release 16), 3GPP TS 38.213 V16.3.0, Sep. 2020, 179 pages.

3rd Generation Partnership Project; Technical Specification Group Radio Access Network; NR; Medium Access Control (MAC) protocol specification (Release 16), 3GPP TS 38.321 V16.2.1, Sep. 2020, 154 pages.

3rd Generation Partnership Project; Technical Specification Group Radio Access Network; NR; Radio Resource Control (RRC) protocol specification (Release 16), 3GPP TS 38.331 V16.2.0, Sep. 2020, 921 pages.

International Patent Application No. PCT/US2021/050253, International Preliminary Report on Patentability, Apr. 27, 2023, 13 pages.

3rd Generation Partnership Project; Technical Specification Group Radio Access Network; NR; NR and NG-RAN Overall Description; Stage 2 (Release 16), 3GPP TS 38.300 V16.3.0, Sep. 2020, 148 pages.

3rd Generation Partnership Project; Technical Specification Group Radio Access Network; NG Radio Access Network (NG-RAN); Stage 2 functional specification of User Equipment (UE) positioning in NG-RAN (Release 16), 3GPP TS 38.305 V16.2.0, Sep. 2020, 117 pages.

* cited by examiner

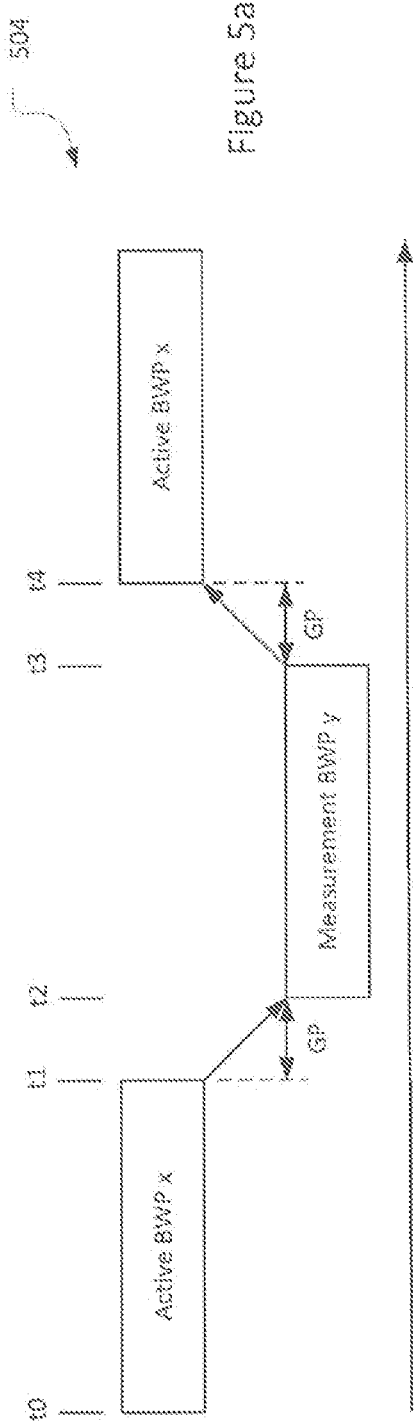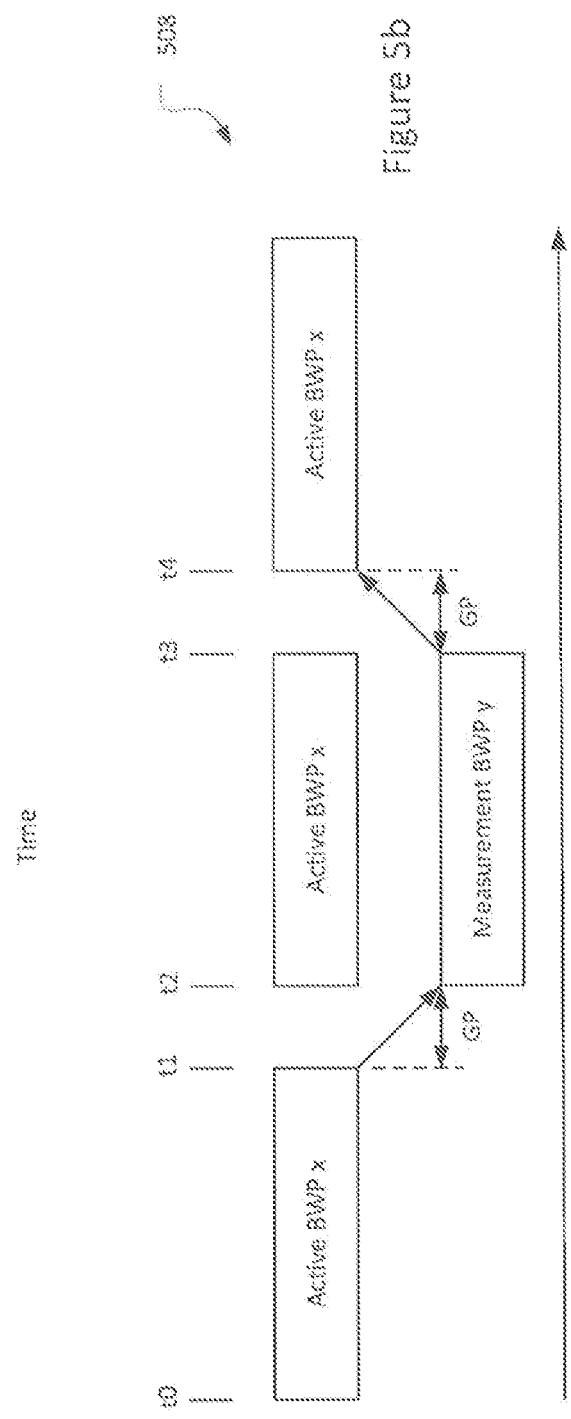

800

Generating configuration information to include indication of BWP to be used for transmission of RLM RS
804

Transmitting the configuration information
808

Transmitting the RLM RS in the measurement BWP
812

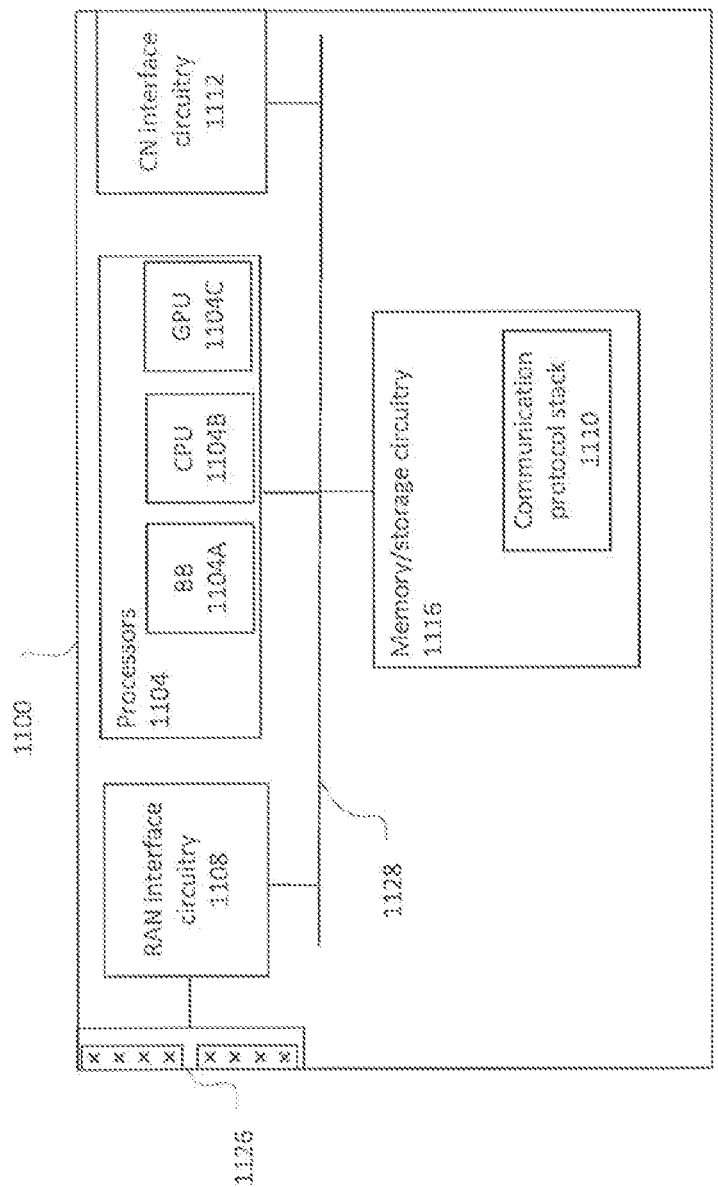

RADIO LINK MONITORING IN NETWORKS WITH BEAM-SPECIFIC BANDWIDTH PARTS

CROSS-REFERENCE TO RELATED APPLICATION

This application is a 371 U.S. National Phase of PCT International Patent Application No. PCT/US2021/050253, filed on Sep. 14, 2021, which claims the benefit of PCT International Application No. PCT/CN2020/121587, filed on Oct. 16, 2020. The contents of both applications are incorporated herein by reference in their entirety for all purposes.

BACKGROUND

Radio link monitoring techniques are described in existing Third Generation Partnership Project (3GPP) networks. These techniques may be used to address a radio link failure that may occur if a handover procedure is unsuccessful or necessary but not performed.

BRIEF DESCRIPTION OF THE DRAWINGS

FIGS. 5a and 5b illustrate signaling diagrams with active and measurement bandwidth parts in accordance with some embodiments.

FIG. 11 illustrates a base station in accordance with some embodiments.

DETAILED DESCRIPTION

Figure 1:
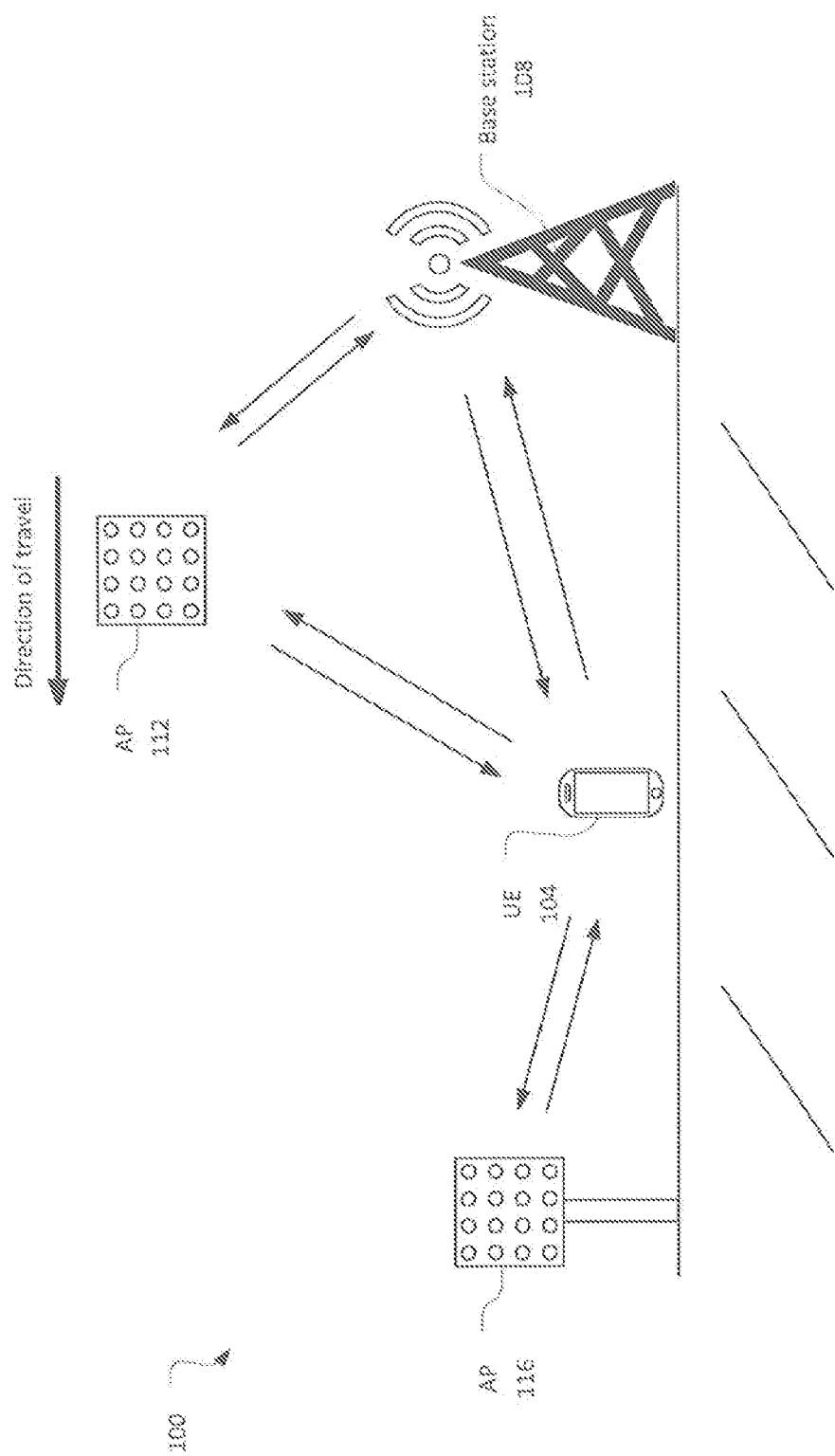
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD)(e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates a network environment 100 in accordance with some embodiments. The network environment 100 may include a UE 104 and a base station 108. The base station 108 may provide one or more wireless serving cells, for example, 3GPP New Radio "NR" cells, through which the UE 104 may communicate with the base station 108. The serving cells may include a primary serving cell (PCell) and one or more secondary serving cells (SCells). In some embodiments, the serving cells may be divided into a master cell group (MCG) and a secondary cell group (SCG), each having a primary serving cell and, potentially, one or more secondary serving cells. A primary serving cell of the SCG may be referred to as PSCell and a secondary serving cell of the SCG may be referred to as an SSCell.

The UE 104 and the base station 108 may communicate over an air interface compatible with 3GPP technical specifications such as those that define Fifth Generation (5G) NR system standards. The base station 108 may be a next-generation-radio access network (NG-RAN) node that is coupled with a 5G core network. An NG-RAN node may be either a gNB to provide an NR user plane and control plane protocol terminations toward the UE 104 or an ng-eNB to provide evolved universal terrestrial radio access (E-UTRA) user plane and control plane protocol terminations toward the UE 104.

The base station 108 may be coupled with one or more antenna panels (APs), for example, APs 112 and 116. In general, the base station 108 may perform the majority of the operations of a communication protocol stack, while the APs 112/116 act as distributed antennas. In some embodiments, the APs 112/116 may perform some lower-level operations of the communication protocol stack (for example, analog physical (PHY) layer operations). The base station 108 may be coupled with the APs 112/116 through a wired or wireless backhaul connection. In various embodiments, the APs 112/116 may be implemented in transmission-reception points (TRPs) or other network entities.

The base station 108 may use APs 112/116 to geographically separate points at which a signal may be transmitted to, or received from, the UE 104. This may increase flexibility of using multiple-input, multiple-output and beamforming enhancements for communicating with the UE 104. The APs 112/116 may be used to transmit downlink transmissions to the UE 104 and receive uplink transmissions from the UE 104. In some embodiments, the distributed transmit/receive capabilities provided by the AP 112/116 may be used for coordinated multipoint or carrier aggregation systems.

The APs 112/116 may be any combination of terrestrial network or non-terrestrial APs. As shown, AP 112 may be considered an non-terrestrial AP while AP 116 may be considered a terrestrial AP. The network environment 100 may be referred to as a non-terrestrial network (NTN) when incorporating at least one non-terrestrial AP.

The non-terrestrial AP 112 may be capable of moving relative to geographical location, typically on fixed or predetermined routes. For example, the non-terrestrial AP 112 may be provided by unmanned aerial vehicles, airplanes, satellites of various altitude classifications (for example, low-earth orbit, medium-earth orbit, geosynchronous each orbit, or high-earth orbit), etc. In embodiments in which the AP 112 is a non-terrestrial AP provided by a satellite, the backhaul connection to the base station 108 may be provided through an NTN gateway coupled with the base station 108 via a high-speed connection, for example, an Ethernet connection.

While various embodiments describe non-terrestrial APs, similar concepts may also be applied to mobile terrestrial APs such as, for example, APs provided by vehicles, trains, etc.

Figure 2:
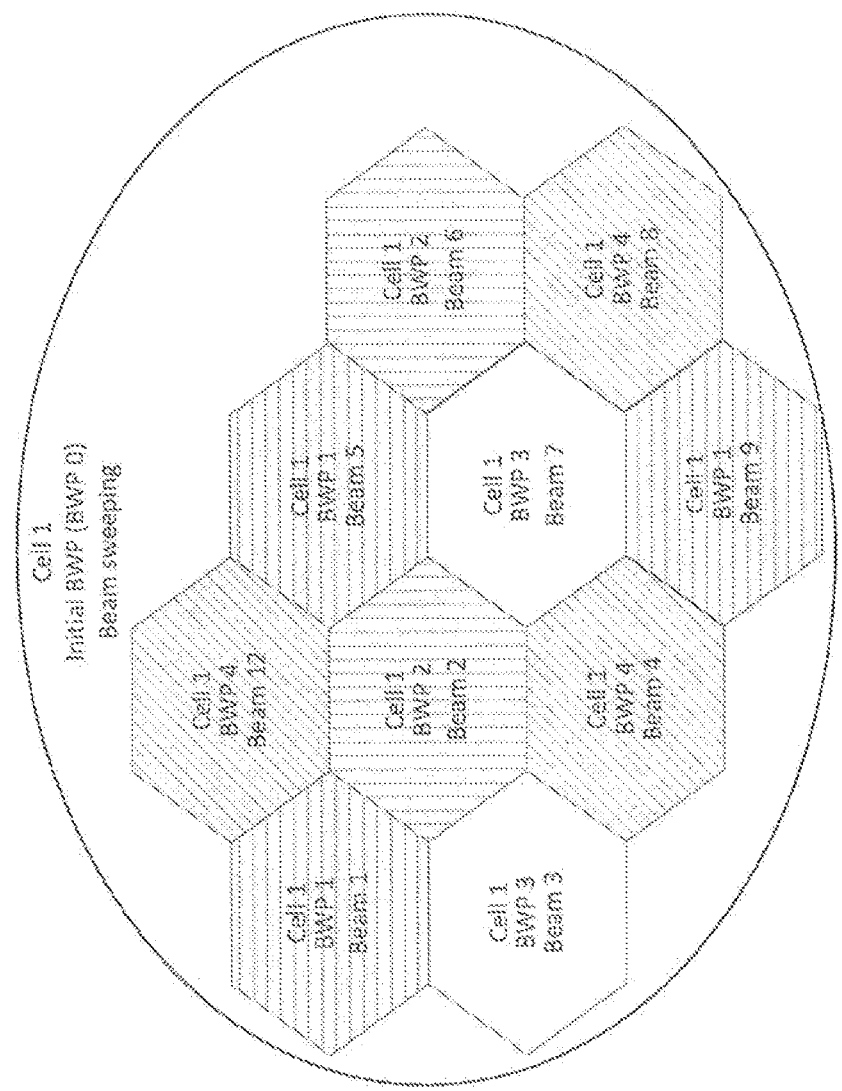
FIG. 2 is a plan view of cell coverage in accordance with some embodiments.

Incorporating mobile or NTN APs into the network environment 100 may facilitate provision of a number of different beams within a physical cell. The cell coverage within the physical cell may leverage the number of beams to increase desired connectivity throughout a relatively large geographical range. FIG. 2 illustrates a plan view of cell coverage 200 in accordance with some embodiments. The base station 108 and the APs 112/116 may provide the cell coverage 200 with beam-specific bandwidth parts (BWPs), for example, different beams applied to different BWPs.

A BWP is a set of common resource blocks that span some, or all, of the channel bandwidth. The UE 104 may be configured with a plurality of BWPs per component carrier. A different number of BWPs may be configured for the uplink or the downlink. In some embodiments, up to four BWPs may be configured per carrier. Typically, only a single BWP is active per carrier per direction. This may be referred to as the active BWP. The UE 104 may receive a physical downlink channel transmission (for example, a physical downlink control channel (PDCCH) or physical downlink shared channel (PDSCH)) within an active downlink BWP and transmit a physical uplink channel transmission (for example, a physical uplink control channel (PUCCH) or a physical uplink shared channel (PUSCH)) within the active uplink BWP.

The UE 104 may determine initial uplink/downlink BWPs when first accessing a serving cell. The initial uplink/downlink BWPs may be signaled through system information block (SIB) 1 or dedicated signaling. The initial downlink BWP may be provided by an initialDownlinkBWP parameter. If such a parameter is not provided, the UE 104 may determine the initial downlink based on a set of resource blocks that belong to a control resource (CORESET) for a Type 0 PDCCH and search space. The set of resource blocks may be determined based on information within a master information block (MIB).

In some embodiments, the BWPs may include a default BWP. In some embodiments, the base station 108 may configure the UE 104 with a default BWP using, for example, a defaultDownlinkBWP-ID. This default BWP ID may be one of the identifiers configured with the initial BWP configuration. In operation, the UE 104 may transition from an active BWP to the default BWP upon expiration of a BWP inactivity timer. If a default downlink BWP is not configured, the UE 104 may use the initial downlink BWP as the default BWP.

Cell coverage 200 includes an initial BWP (BWP 0) in which beam sweeping is performed. The base station 108 may cause a plurality of synchronization signal blocks (SSBs) to be transmitted in BWP 0 through a corresponding plurality of beams. Measurements reported to the base station 108 from the UE 104 based on these SSBs may then be used to select a desired beam or beams for the UE 104 or for other beam management operations.

Cell coverage 200 may further include four other BWPs. BWP 1 may be provided with beam 1, beam 5, and beam 9. BWP 2 may be provided with beam 2 and beam 6. BWP 3 may be provided with beam 3 and beam 7. And BWP 4 may be provided with beam 4, beam 8, and beam 12. The base station 108 may address inter-beam interference by configuring the cell coverage 200 in a manner to maintain orthogonality between bandwidth for adjacent BWPs. For example, BWPs provided by different beams may not be adjacent to one another to mitigate inter-beam interference.

The UE 104 may monitor downlink radio link quality of the primary cells (PCell and PSCells) for purposes of indicating out-of-sync/in-sync status to higher layers and, potentially, declaring a radio link failure. Prior networks only monitored downlink radio link quality in active downlink BWPs of a primary serving cell.

Figure 3:
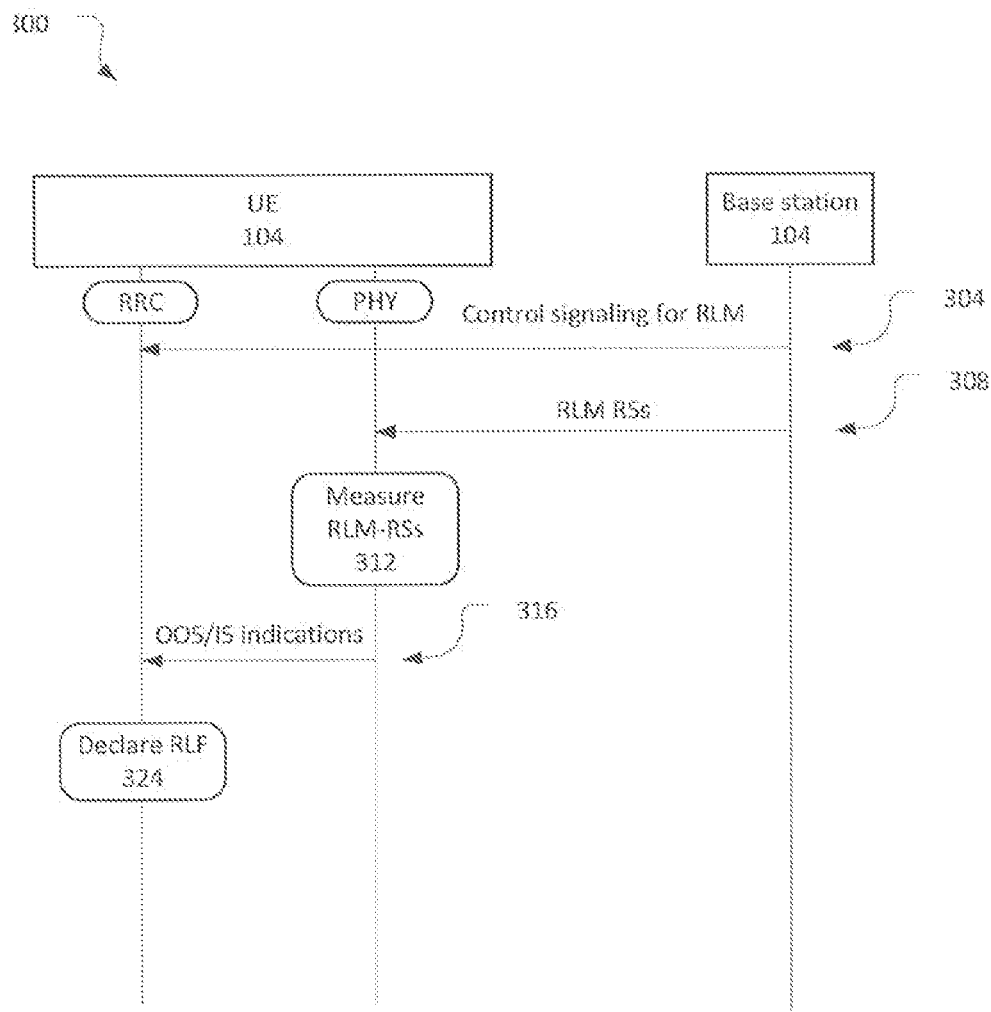
FIG. 3 illustrates radio link monitoring operations in accordance with some embodiments.

FIG. 3 illustrates various radio link monitoring (RLM) operations 300 in accordance with some embodiments. RLM may be used to monitor link quality for a primary serving cells (PCell or PSCell) in BWPs other than the active downlink BWP as described herein.

The RLM operations 300 may include, at 304, the base station 104 transmitting control signaling for the RLM operations 300. In some embodiments, the control signaling may configure a set of reference signals (RSs) for the UE 104 to measure for RLM. For example, the base station 108 may use a RadioLinkMonitoringRS to configure a set of RSs for the UE 104. These may be referred to as RIM RSs and may include, for example, channel state information-reference signals (CSI-RS) or synchronization signal blocks (SSB). In some embodiments, the configuration may further include a purpose for the RLM RSs such as, for example, radio link failure (RLF) detection.

In some embodiments, the UE 104 may not be specifically configured with RLM RSs, for example, may not be provided RadioLinkMonitoringRS. In these embodiments, the UE 104 may determine which RSs to use as RLM RSs based on other information. For example, the UE 104 may use a reference signal provided for an active transmission configuration indicator (TCI) state for PDCCH reception as the RLM RS if the active TC state for PDCCH reception includes only one reference signal.

The control signaling transmitted at 304 may additionally/alternatively configure other parameters used for RLF and discussed below. These parameters may include in-sync/out-of-sync parameters (for example, counter values (N310 and N311), block error ratio (BLER) values, and a timer value (T310)). The control signal may further configure BWP locations of the RIM RSs or BWP switching periods as will be described herein.

The RLM operations 300 may further include, at 308, transmitting the RIM RSs. These RLM RSs may be transmitted periodically, aperiodically, or based on a trigger event. The RLM RSs may be transmitted directly by the base station 108 or through APs 112/16. To facilitate the multi-beam operation of a serving cell, the RLM RSs may be transmitted with different beams.

The RLM operations may include a physical (PHY) layer (which may also be referred to as Layer 1 (L1)) of the UE 104 measuring the RLM RSs and generating out-of-sync or in-sync indications based on comparing the measurements to various quality levels. For example, the UE 104 may generate out-of-sync indications if all RLM-RSs of a measurement period are below a first quality level (Qout) at which the radio link is considered unreliable, which may be based on an out-of-sync BLER (BLERout) value of a hypothetical PDCCH transmission; and generate an in-sync indication if at least one RLM-RS of the measurement period exceeds a second quality level (Qin) at which the radio link is considered reliable, which may be based on in in-sync BLER value (BLERin) of the hypothetical PDCCH transmission. The measurement period may have a periodicity referred to as an in-sync/out-of-sync (IS/OOS) periodicity, in some embodiments, the BLERout may be set at 10% and BLERin may be set at 2%.

At 316, the PHY layer may provide the out-of-sync and in-sync indications to an RRC layer. The RRC layer may determine whether an RLF occurs based on receipt of the indications and values of counters and timer. For example, the RRC layer may start a timer, T310, if the RRC layer receives N310 consecutive out-of-sync indications and may stop and reset T310 if the RRC layer receives N311 consecutive in-sync indications. If T310 expires, the RRC layer may declare RLF at 324.

The RRC layer of the UE 104 may provide configuration information to the PHY layer (for example, the set of resources for the RLM-RSs and BLER thresholds for Qin and Qout). The RRC layer may also evaluate conditions for radio link failure based on the out-of-sync and in-sync indications from the PHY layer. If conditions warrant, the RRC layer may trigger the RLF and initiate reestablishment of an RRC connection.

Radio link monitoring in the networks having non-terrestrial APs, such as network environment 100, may not be conducive to transmission of all RLM RSs in an active BWP as required by previous radio access network specifications. For example, if the UE 104 is in BWP 1, in order to monitor the quality for other beams in a cell, the RLM RSs may need to be transmitted in another BWP.

Embodiments of the present disclosure provide RLM for networks that may include non-terrestrial APs. Aspects include control signaling for RLM RSs and behavior of the UE 104 for RLM and control/data communication with the base station 108.

The RLM RSs may be transmitted in a serving cell according to one or more of the following three options. In option 1, all RLM RSs may be configured in the initial BWP (for example, BWP 0, which is also used for beam sweeping). In option 2, the RLM RSs may be configured in BWP(s) besides the RLM RSs in active BWP. In option 3, the RLM RSs may be configured in an initial BWP and an active BWP.

Figure 4:
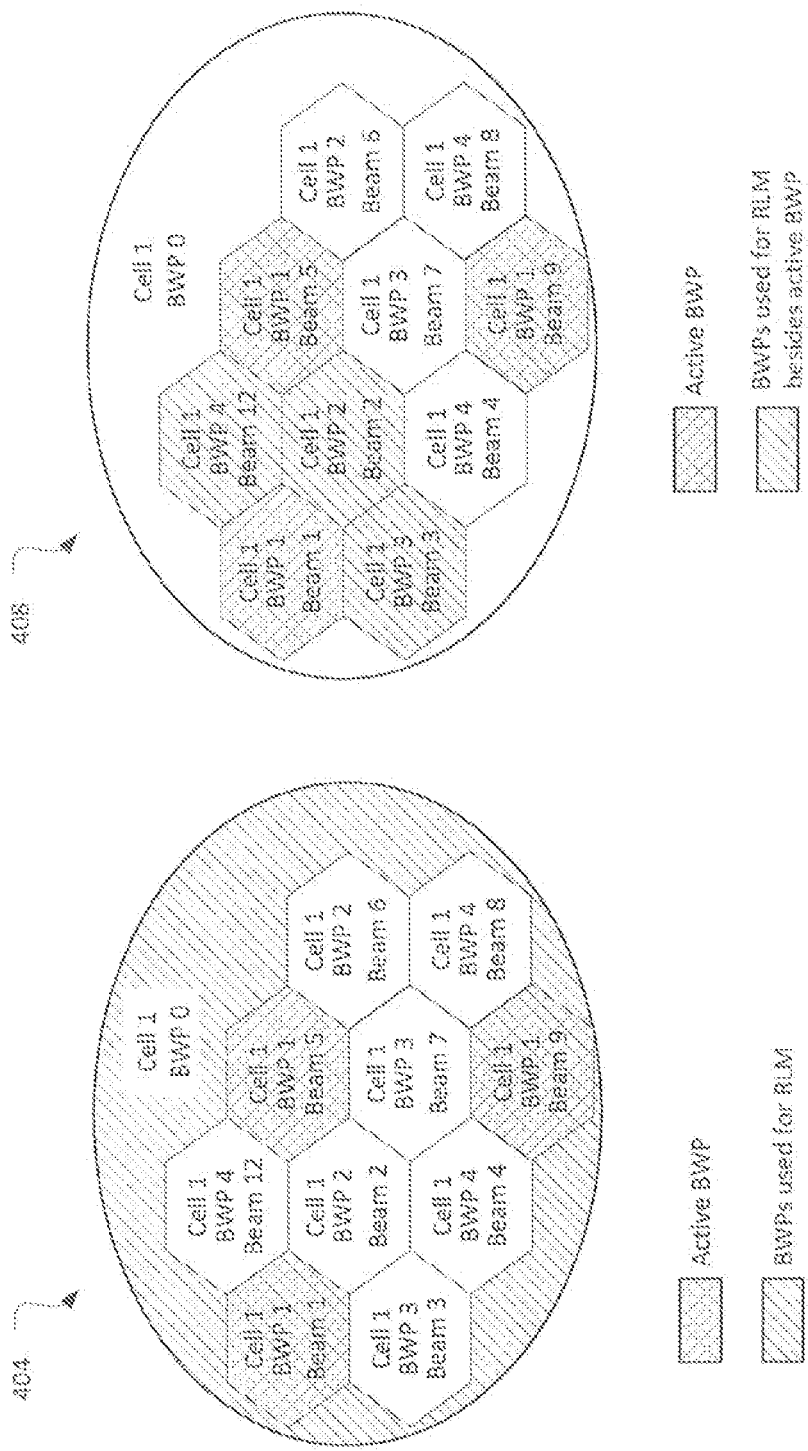
FIG. 4 illustrates the plan view of cell coverage describing various options for transmitting radio link monitoring reference signals in accordance with some embodiments.

FIG. 4 includes plan views of cell coverage in accordance with some embodiments. In particular, cell coverage 404 corresponds to the RLM RS configuration described in option 1, and cell coverage 408 corresponds to the RLM RS configurations described in option 2.

Cell coverage 404 shows the UE 104 configured to communicate with BWP 1 as the active BWP. BWP 0 is configured for RLM RS transmission.

Cell coverage 408 also shows the UE 104 configured to communicate with BWP 1 as the active BWP. However, instead of configuring BWP 0 for RLM RS transmission, cell coverage 408 indicates that BWPs 2, 3, and 4 are configured for RLM RS transmission. In some embodiments, only the BWPs on adjacent beams are configured for RLM RS (for example BWPs 2, 3, and 4 on respective beams 2, 3, and 12, which are adjacent to beam 1). However, in other embodiments, all beams of a particular BWP may be configured for RLM RS.

In some embodiments, the active BWP may also be configured for RLM RS, for example, with reference to cell coverage 404, both the BWP 0 and BWP 1 may be configured for RLM RS transmission. In other embodiments, the RLM RS may only be transmitted in the other BWP. For example, with reference to cell coverage 404, only the BWP 0 may be configured for RLM RS transmission.

In some embodiments, for options 1, 2, and 3, if the RLM RSs are not explicitly configured by RRC, the UE 104 may assume the RLM RSs are from the active BWP.

The control signaling to configure RLM RS for options 1-3 may include RRC configuration information elements (IEs). For example, a radio link monitoring configuration (RadioLinkMonitoringConfig) IE may be used to configure RLM for detecting beam or cell radio link failure. RadioLinkMonitoringConfig IE may define a number of failure detection resources from a list of resources provided by a radio link monitoring RS (RadioLinkMonitoringRS) IE and may also provide a purpose for the RLM RSs as beam failure, RLF, or both.

In option 1, all the RLM RSs may be selected from those configured in initial BWP. Thus, the RLM configuration IEs may configure a plurality of RLM RSs, and the UE 104 may assume that all of these RLM RSs are to be transmitted in BWP 0. In option 2, the BWP for the RLM RS may be configured by higher layer signaling, such as, for example RRC signaling. In option 3, whether the RLM RS is from an initial BWP or currently active BWP can be configured by higher-layer signaling such as, for example, RRC signaling.

Definitions of RRC configuration elements in, for example, 3GPP Technical Specification (TS) 38.331 v16.2.0 (2020-09) may be updated to reflect the control signaling described in embodiments of the present disclosure. For example, a RadioLinkMonitoringRS IE corresponding to option 2 may be updated as follows.

RadioLinkMonitoringRS::=SEQUENCE {
   radioLinkMonitoringRS-Id,
RadioLinkMonitoringRS-Id,
   purpose ENUMERATED
{beamFailure, rlf, both},
   detectionResource CHOICE {
     ssb-Index SSB-Index.
     csi-RS-Index NZP-CSI-RS-ResourceID
   }
   bwp-Id BWP-Id
OPTIONAL
. . .
}

The BWP identifier may be added to the RadioLinkMonitoringRS parameter to indicate the specific BWP in which the RLM RSs are to be transmitted. In this manner, a BWP other than the active BWP (or even the initial BWP) may be designed for transmission of the RLM RSs.

An example RadioLinkMonitoringRS IE corresponding to option 3 may be updated as follows.

RadioLinkMonitoringRS::SEQUENCE {
   radioLinkMonitoringRS-Id,
RadioLinkMonitoringRS-Id.
   purpose ENUMERATED
{beamFailure, rlf, both},
   detectionResource CHOICE {
     ssb-Index SSB-Index,
     csi-RS-Index NZP-CSI-RS-ResourceID
   },
   initialBWP ENUMERATED
{true} OPTIONAL
. . .
}

In this embodiment, the initial BWP field may be added to the RadioLinkMonitoringRS parameter to provide an indication of whether the RLM RS is from the initial BWP. For example, if the initialBWP field is set to true, the RLM RSs are to be transmitted in BWP 0.

In some embodiments, definitions provided in 3GPP TSs may be updated to allow measurement of RLM RSs in BWPs other than the active BWP of the primary serving cells. To support option 1 operation in an SCG, 3GPP TS 38.213 v16.3.0 (2020-09), section 5 may be updated to tend "The UE is not required to monitor the downlink radio link quality in DL BWPs other than the active DL BWP on the PSCell for terrestrial networks. For non-terrestrial networks, the UE assumes all the reference signals provided by RadioLinkMonitoringRS are in initial DL BWP on the PScell."

3GPP TS 38.213, section 5, may be further updated to read that "If the UE is not provided RadioLinkMonitoringRS and the UE is provided for PDCCH reception TCI states that include one or more of a CSI-RS . . . the UE is not required to use for radio link monitoring an aperiodic or semi-persistent RS or RS not in active BWP in PSCell." Because the previous update released the restriction for NTN that all RLM RS should be in active BWP, this update may provide for implicit configuration of RLM RS, since it may be used for current reception, such RLM RS may be in an active BWP instead of initial BWP.

In some embodiments, communication and measurement protocols may be updated to account for the UE 104 measuring RLM RSs in a BWP other than the active BWP. As used herein, the BWP providing the RLM RSs may be referred to as the measurement BWP. For example, when the UE 104 switches to a BWP other than the active BWP for measurement purposes, both the UE 104 and the base station 108 may maintain a common understanding for the timing of the switch and related operations.

In some embodiments, the base station 108 may configure the UE 104 with one or more BWP switching periods. A switching period may include a starting slot index, a duration, a periodicity, and a target BWP index. A target BWP index may not be needed for option 1 (in which all the RLM RSs are configured in the initial BWP) or option 3 (in which the RLM RSs are configured in the initial BWP and the active BWP). Further, in some embodiments, the target BWP index may be provided separately from the BWP switching configuration information.

In some embodiments, the BWP switching period may be configured by higher layer signaling such as, for example, RRC or MAC CE signaling. Additionally/alternatively, the BWP switching period may be configured or signaled by DCI. The DCI may be based on a dedicated DCI format with a radio network temporary identifier (RNTI), for example, BWP-RNTI, configured by higher layer signaling.

FIG. 5 illustrates signaling diagrams for active and measurement BWPs in accordance with some embodiments.

Signaling diagram 504 illustrates the UE 104, at t0, communicating (for example, sending or receiving control/data signals) with the base station 108 through active BWP x. At t1, the UE 104 may initiate a switch to a measurement BWP y. At t2, the UE 104 may begin measurements of RLM RSs transmitted in the measurement BWP y. After a period of time, at t3, the UE 104 may initiate a switch back to the active BWP x. At t4, the UE 104 may continue communicating with the base station 108 through the active BWP x.

The UE 104 may assume that no uplink or downlink communication will occur with the base station during the guard periods (GPs) between t1 and t2 and between t3 and t4. The duration for the guard periods may be predefined by a 3GPP TS, configured by the base station 108, or reported by UE capability. In some embodiments, minimal desired guard period may be different for different higher-layer configurations for the two BWPs. For example, a minimal desired guard period may be smaller if higher-layer configurations are the same for the active and measurement BWPs. The higher-layer configurations may be PDCCH/PDSCH/PUSCH/PUCCH, subcarrier spacing, cyclic prefix type, etc. If the higher-layer configurations are different, the minimal desired guard period may be larger to accommodate changes to the appropriate configuration parameters.

In some embodiments, the UE 104 may assume that it is only required to perform measurements during the BWP switching period (for example, when receiving RLM RSs in measurement BWP y). In other embodiments, the UE 104 make continue to communicate with the base station 108 during the BWP switching period in the measurement BWP y.

Signaling diagram 508 illustrates the UE 104, at t0, communicating with the base station 108 through the active BWP x. At t1, the UE 104 may initiate activation of an additional BWP, for example, measurement BWP Y, to perform the measurement. At t2, the UE 104 may begin measurements of RLM RSs transmitted in the measurement BWP y. However, unlike signaling diagram 504, the UE 104 may maintain more than one BWP while performing RLM. In particular, the UE 104 may continue to communicate with the base station 108 through the active BWP x while measuring the RLM RS in the measurement BWP y. At t3, the UE 104 may deactivate the measurement BWP y.

The guard periods in this example may be defined for the UE 104 to switch between a first state having one active BWP and a second state having the active BWP and the additional BWP (for example, the measurement BWP y). The UE 104 may assume that no uplink or downlink communication is to occur with the base station 108 during the guard periods. This may be due, in part, to the potential of activating/deactivating the measurement BWP y interfering with communications on the active BWP x.

Configuring the periods for activating the measurement BWP y in this embodiment may be similar to that described above with respect to the configuration of the BWP switching periods. In this embodiment, the "switching period" may be a period of switching on/off the measurement BWP y. Switching, in this sense, does not necessarily imply switching away from the active BWP x.

In some embodiments, the UE 104 may only communicate with the base station 108 in the active BWP x during the period between t2 and t3. In other embodiments, the UE 104 may communicate with the base station 108 in both the active BWP x and the measurement BWP y during the period between t2 and t3.

In some embodiments, the UE 104 may operate according to signaling diagram 504 or 508 based on a predefined configuration (for example, indicated in a 3GPP TS), configured by higher-layer signaling, for example, RRC, or based on UE capability.

In some embodiments, an IS/OOS periodicity (for example, measurement periods in which the in-sync or out-of-sync indications are determined) could be based on the periodicity of the measurement BWP. For example, the IS/IOS periodicity be determined as a minimum of {periodicity of measurement BWP, 10 ms}.

Figure 6:
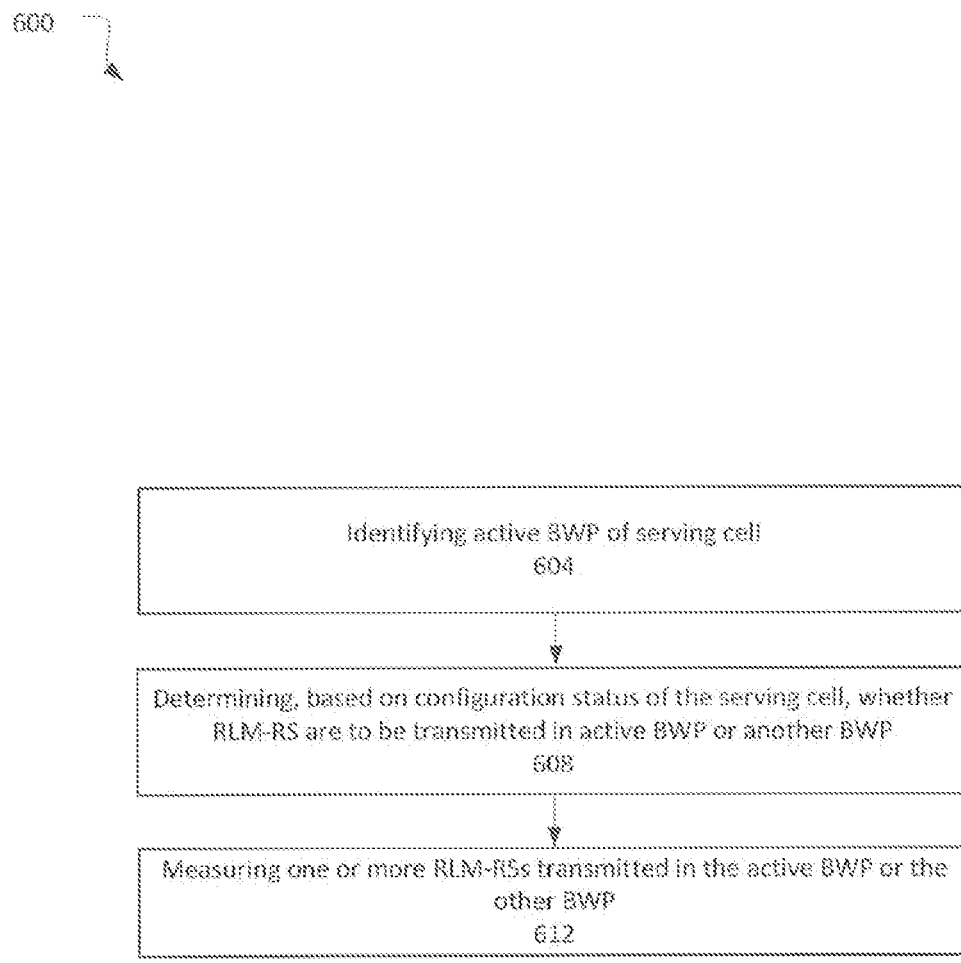
FIG. 6 illustrates an operational flow/algorithmic structure in accordance with some embodiments.

FIG. 6 illustrates an operation flow/algorithmic structure (00 in accordance with some embodiments. The operation flow/algorithmic structure 600 may be performed or implemented by a UE such as, for example, UE 104 or UE 1000 or components thereof, for example, baseband processor 1004A.

The operation flow/algorithmic structure 60) may include, at 604, identifying an active BWP of a serving cell. The active BWP may provide resources with which the UE may use to communicate with a radio network through a non-terrestrial or other mobile AP. In some embodiments, the UE may first identify an initial BWP through, for example, SIB1 or dedicated signaling with which it connects to the radio network. The UE may perform various connection establishment operations with the initial BWP and may be configured with one or more candidate BWPs. One of the candidate BWPs may then be designated as the active BWP.

The operation flow/algorithmic structure 600 may further include, at 608, determining, based on a configuration status of the serving cell, whether RLM-RS are to be transmitted in an active BWP or another BWP. For example, the UE may determine which BWPs of the network are to operate as measurement BWPs.

In some embodiments, the UE may receive explicit configuration information to indicate the measurement BWPs. For example, the configuration information may indicate all the RLM RSs are configured in the initial BWP; the RLM RSs are configured in specific BWPs; or the RLM RSs are configured in the initial and active BWPs. If the UE determines that a configuration status includes no such explicit configuration, the UE may determine that the active BWP is to also function as the measurement BWP.

The operation flow/algorithmic structure 600 may further include, at 612, measuring one or more RLM RSs transmitted in the active BWP or the other BWP. For example, the UE may measure the RLM RSs in the measurement BWP, determined from the configuration status. The measurements from the RLM RS may be used to determine in-sync and out-of-sync indications that serve as a basis for an RLM operation as discussed herein.

The measuring of the RLM RS may include switching to, or otherwise activating, a measurement BWP to receive RLM RSs. In some embodiments, the IE may concurrently communicate with the base station while performing the measurements in the measurement BWP. The concurrent communication may take place through the measurement BWP or the active BWP as described in various embodiments.

Figure 7:
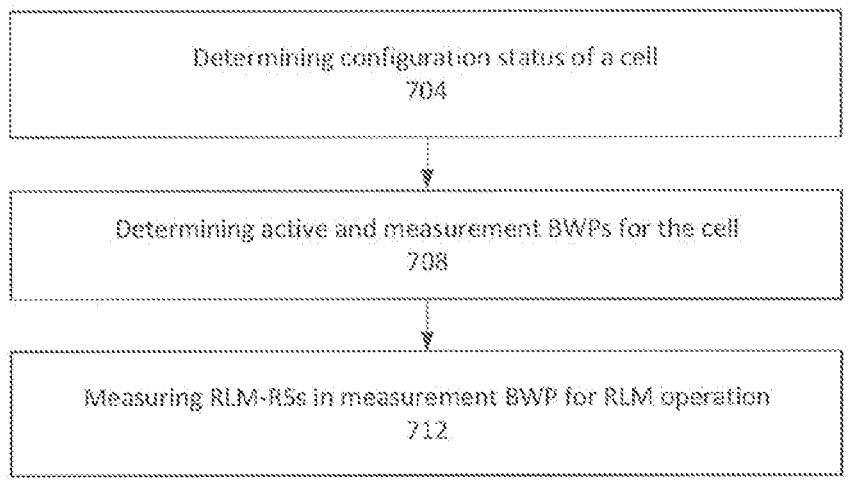
FIG. 7 illustrates another operational flow/algorithmic structure in accordance with some embodiments.

FIG. 7 may include an operation flow-algorithmic structure 700 in accordance with some embodiments. The operation flow/algorithmic structure 700 may be performed or implemented by a UE such as, for example, UE 104 or 1000; or components thereof, for example, baseband processor 1004A.

The operation flow-algorithmic structure 700 may include, at 704, determining a configuration status of the cell. The configuration status may be determined based on configuration information received through an initial BWP as well as the presence or absence of explicit configurations of measurement BWPs as described above with respect to 604, for example.

The operation flow/algorithmic structure 700 may further include, at 708, determining active and measurement BWPs for the cell. In some embodiments, the measurement BWPs may include the active BWP, an initial BWP, a default BWP, or one or more BWPs specifically configured by RLM configuration information.

The operation flow/algorithmic structure 700 may further include, at 712, measuring RLM-RSs in the measurement BWP(s) for an RLM operation. The measuring of the RLM RSs may include switching on a measurement BWP for reception of the RLM RSs. The UE may further determine one or more in-sync or out-of-sync indications based on the measured RLM RSs. If appropriate, the UE may declare a radio link failure and initiate a connection reestablishment procedure.

Figure 8:
FIG. 8 illustrates another operational flow/algorithmic structure in accordance with some embodiments.

FIG. 8 may include an operation flow/algorithmic structure 800 in accordance with some embodiments. The operation flow/algorithmic structure 800 may be performed or implemented by a base station such as, for example, base station 108 or gNB 1100; or components thereof, for example, baseband processor 1104A.

The operation flow/algorithmic structure 800 may include, at 804, generating configuration information to include an indication of a BWP to be used for transmission of RLM RS. In some embodiments, the configuration information may be a RadioLinkMonitoringRS IE that provides an index of a BWP that is to serve as the measurement BWP or provides an indication that an initial BWP is to operate as a measurement BWP.

In some embodiments, the configuration information may further include BWP switching configuration information. For example, the configuration information may include starting slot index, duration, or periodicity of the BWP switching period.

The operation flow/algorithmic structure 800 may further include, at 808, transmitting the configuration information. Transmission of the configuration information may occur in one or more configuration messages transmitted through one or more signaling procedures. For example, in some embodiments, the RadioLinkMonitoringRS IE may be transmitted using RRC signaling, while the BWP switching configuration information is transmitted through additional RRC signaling, MAC CE, or DCI.

The operation flow/algorithmic structure 800 may further include, at 812, transmitting the RLM RSs in the measurement BWPs Transmission of the RIM RSs may be periodic, aperiodic, or event driven. The RLM RSs may be transmitted on one or more beams by one or more APs or base stations.

Figure 9:
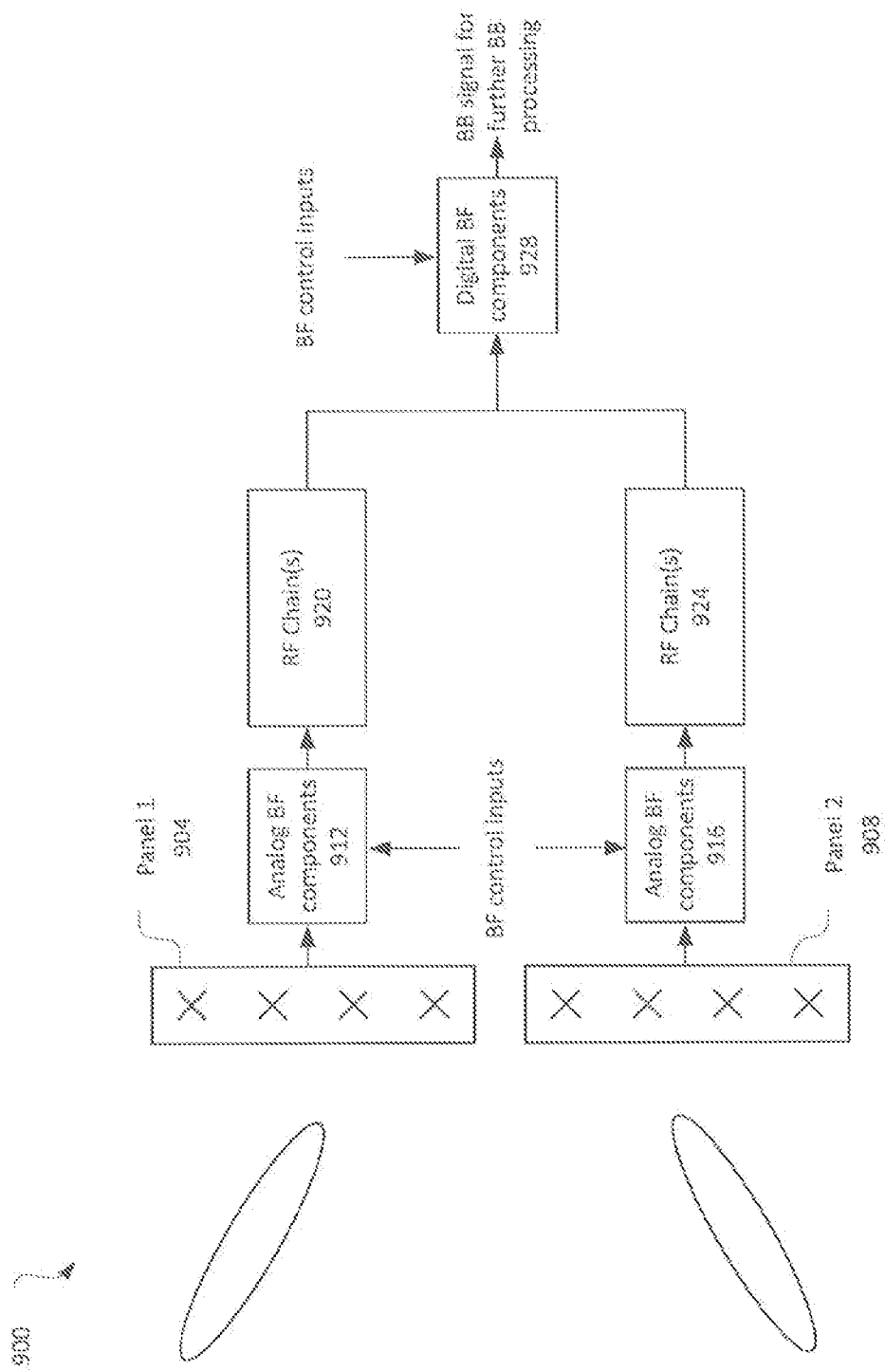
FIG. 9 illustrates beamforming components of a device in accordance with some embodiments.

FIG. 9 illustrates beamforming components 900 of a device in accordance with some embodiments. The device may be the LTE 104, base station 108, AP 112, or AP 116. The receive components 900 may include a first antenna panel, panel 1 904, and a second antenna panel, panel 2 908. Each antenna panel may include a number of antenna elements.

The antenna panels may be coupled to respective analog beamforming (BF) components. For example, panel 1 904 may be coupled with analog BF components 912 and panel 2 908 may be coupled with analog BF components 916.

The analog BF components may be coupled with one or more radio-frequency (RF) chains. For example, analog BF components 912 may be coupled with one or more RF chains 920 and analog BF components 916 may be coupled with one or more RF chains 924. The RF chains may amplify a receive analog RF signal, downconvert the RF signal to baseband, and convert the analog baseband signal to a digital baseband signal, which may be provided to digital BF components 928. The digital BF components 928 may provide a baseband (BB signal) for further BB processing.

In various embodiments, control circuitry, which may reside in a baseband processor, may provide BF weights to the analog/digital BF components to provide a receive beam at respective antenna panels. These BF weights may be determined by the control circuitry based on received reference signals and corresponding QCL/TCI information as described herein. In some embodiments, the BF weights may be phase-shift values provided to phase shifters of the analog BF components 912 or complex weights provided to the digital BF components 928. In some embodiments, the BF components and antenna panels may operate together to provide a dynamic phased-array that is capable of directing the beams in the desired direction.

In various embodiments, beamforming may include analog, only digital, or a hybrid analog-digital beamforming. Digital beamforming may utilize separate RF chains that respectively correspond to the antenna elements.

While the beamforming components 90 describe receive beamforming, other embodiments may include beamforming components that perform transmit beamforming in analogous manners.

Figure 10:
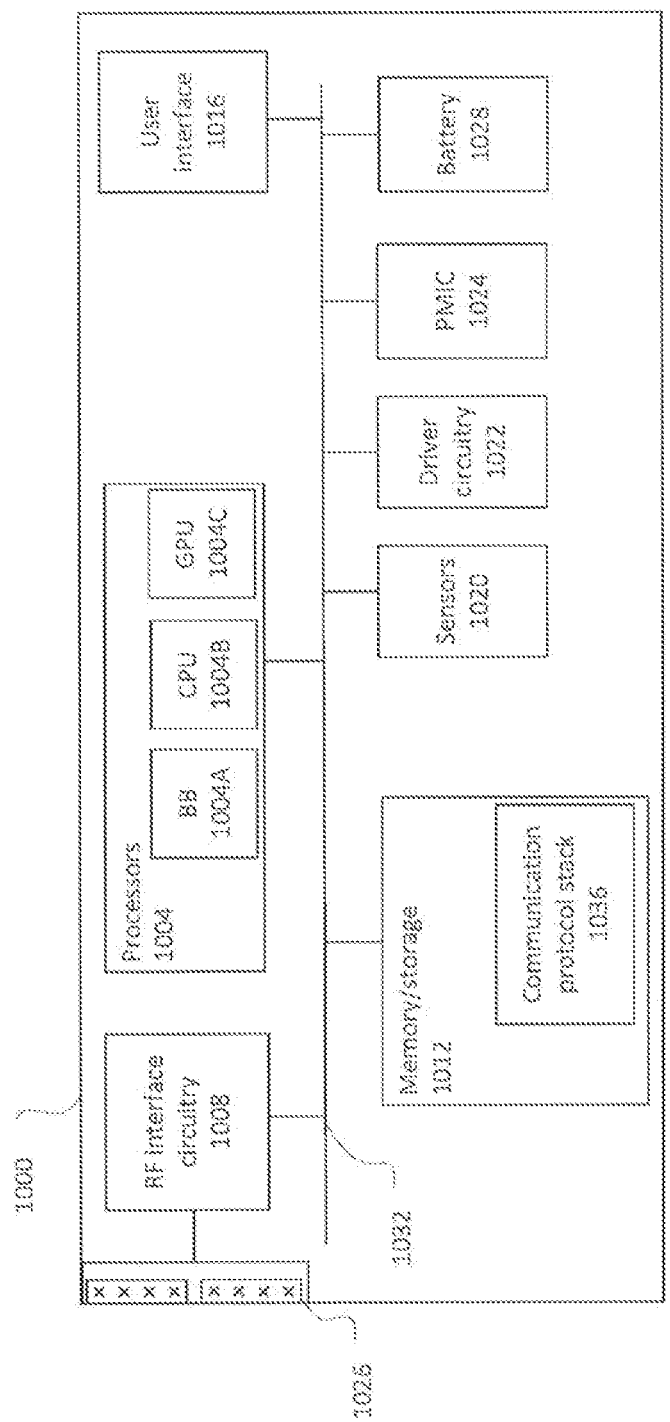
FIG. 10 illustrates a user equipment in accordance with some embodiments.

FIG. 10 illustrates a UE 1000 in accordance with some embodiments. The UE 1000 may be similar to and substantially interchangeable with UE 104 of FIG. 1.

The UE 1000 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/ monitoring devices (for example, cameras, video cameras, etc.), wearable devices (for example, a smart watch), relaxed-IoT devices.

The UE 1000 may include processors 1004, RF interface circuitry 1008, memory/storage 1012, user interface 1016, sensors 1020, driver circuitry 1022, power management integrated circuit (PMIC) 1024, antenna structure 1026, and battery 1028. The components of the UE 1000 may be implemented as integrated circuits (ICs), portions thereof, discrete electronic devices, or other modules, logic, hardware, software, firmware, or a combination thereof. The block diagram of FIG. 10 is intended to show a high-level view of some of the components of the UE 1000. However, some of the components shown may be omitted, additional components may be present, and different arrangement of the components shown may occur in other implementations.

The components of the UE 1000 may be coupled with various other components over one or more interconnects 1032, which may represent any type of interface, input/output, bus (local, system, or expansion), transmission line, trace, optical connection, etc. that allows various circuit components (on common or different chips or chipsets) to interact with one another.

The processors 1004 may include processor circuitry such as, for example, baseband processor circuitry (BB) 1004A, central processor unit circuitry (CPU) 1004B, and graphics processor unit circuitry (GPU) 1004C. The processors 1004 may include any type of circuitry or processor circuitry that executes or otherwise operates computer-executable instructions, such as program code, software modules, or functional processes from memory/storage 1012 to cause the UE 1000 to perform operations as described herein.

In some embodiments, the baseband processor circuitry 1004A may access a communication protocol stack 1036 in the memory/storage 1012 to communicate over a 3GPP compatible network. In general, the baseband processor circuitry 1004A may access the communication protocol stack to: perform user plane functions at a PHY layer, MAC layer, RLC layer, PDCP layer, SDAP layer, and PDL layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 1008.

The baseband processor circuitry 1004A may generate or process baseband signals or waveforms that carry information in 3GPP-compatible networks. In some embodiments, the waveforms for NR may be based cyclic prefix OFDM "CP-OFDM" in the uplink or downlink, and discrete Fourier transform spread OFDM "DFT-S-OFDM" in the uplink.

The memory/storage 1012 may include one or more non-transitory, computer-readable media that includes instructions (for example, communication protocol stack 1036) that may be executed by one or more of the processors 1004 to cause the UE 1000 to perform various operations described herein. The memory/storage 1012 include any type of volatile or non-volatile memory that may be distributed throughout the UE 1000. In some embodiments, some of the memory/storage 1012 may be located on the processors 1004 themselves (for example, L1 and L2 cache), while other memory/storage 1012 is external to the processors 1004 but accessible thereto via a memory interface. The memory/storage 1012 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 1008 may include transceiver circuitry and radio frequency front module (RFEM) that allows the UE 1000 to communicate with other devices over a radio access network. The RF interface circuitry 1008 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 1026 and proceed to filter and amplify (with a low-noise amplifier) the signal. The signal may be provided to a receiver of the transceiver that down-converts the RF signal into a baseband signal that is provided to the baseband processor of the processors 1004.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1026.

In various embodiments, the RF interface circuitry 1008 may be configured to transmit/receive signals in a manner compatible with NR access technologies.

The antenna 1026 may include antenna elements to convert electrical signals into radio waves to travel through the air and to convert received radio waves into electrical signals. The antenna elements may be arranged into one or more antenna panels. The antenna 1026 may have antenna panels that are omnidirectional, directional, or a combination thereof to enable beamforming and multiple input, multiple output communications. The antenna 1026 may include microstrip antennas, printed antennas fabricated on the surface of one or more printed circuit boards, patch antennas, phased array antennas, etc. The antenna 1026 may have one or more panels designed for specific frequency bands including bands in FR1 or FR2.

The user interface circuitry 1016 includes various input/output (I/O) devices designed to enable user interaction with the UE 1000. The user interface 1016 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 1100.

The sensors 1020 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1022 may include software and hardware elements that operate to control particular devices that are embedded in the UE 1000, attached to the UE 1100, or otherwise communicatively coupled with the LIE 1000. The driver circuitry 1022 may include individual drivers allowing other components to interact with or control various input/output (I/O) devices that may be present within, or connected to, the UE 1000. For example, driver circuitry 1022 may include a display driver to control and allow access to a display device, a touchscreen driver to control and allow access to a touchscreen interface, sensor drivers to obtain sensor readings of sensor circuitry 1020 and control and allow access to sensor circuitry 1020, drivers to obtain actuator positions of electro-mechanic components or control and allow access to the electro-mechanic components, a camera driver to control and allow access to an embedded image capture device, audio drivers to control and allow access to one or more audio devices.

The PMIC 1024 may manage power provided to various components of the UE 100). In particular, with respect to the processors 1004, the PMIC 1024 may control power-source selection, voltage scaling, battery charging, or DC-to-DC conversion.

In some embodiments, the PMIC 1024 may control, or otherwise be part of, various power saving mechanisms of the UE 1000 including DRX as discussed herein.

A battery 1028 may power the UE 1000, although in some examples the UE 1000 may be mounted deployed in a fixed location, and may have a power supply coupled to an electrical rid. The battery 1028 may be a lithium ion battery, a metal-air battery, such as a zinc-air battery, an aluminum-air battery, a lithium-air battery, and the like. In some implementations, such as in vehicle-based automotive applications, the battery 1028 may be a typical lead-acid automotive battery.

FIG. 11 illustrates a gNB 1100 in accordance with some embodiments. The gNB node 1100 may similar to and substantially interchangeable with base station 108 of FIG. 1.

The gNB 1104 may include processors 1104, RF interface circuitry 1108, core network "CN" interface circuitry 1112, memory/storage circuitry 1116, and antenna structure 1126.

The components of the gNB 1100 may be coupled with various other components over one or more interconnects 1128.

The processors 1104, RF interface circuitry 1108, memory/storage circuitry 1116 (including communication protocol stack 1110), antenna structure 1126, and interconnects 1128 may be similar to like-named elements shown and described with respect to FIG. 9.

The CN interface circuitry 1112 may provide connectivity to a core network, for example, a $5^{th}$ Generation Core network "5GC" using a 5GC-compatible network interface protocol such as carrier Ethernet protocols, or some other suitable protocol. Network connectivity may be provided to/from the gNB 1100 via a fiber optic or wireless backhaul. The CN interface circuitry 1112 may include one or more dedicated processors or FPGAs to communicate using one or more of the aforementioned protocols. In some implementations, the CN interface circuitry 1112 may include multiple controllers to provide connectivity to other networks using the same or different protocols.

In some embodiments, the gNB 1100 may be coupled with APs, such as APs 112 or 116, using the antenna structure 1126, CN interface circuitry, or other interface circuitry.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

In the following sections, further exemplary embodiments are provided.

Example 1 includes a method comprising identifying an active bandwidth part (BWP) of a serving cell, the active BWP to provide resources with which the UE may use to communicate with a radio network having beam-specific BWPs; determining, based on a configuration status of the serving cell, whether radio link monitoring-reference signals (RLM-RSs) are to be transmitted in the active BWP or a second BWP that is different from the active BWP; and measuring one or more RLM-RSs transmitted in the active BWP or the second BWP to perform a radio link monitoring (RLM) operation.

Example 2 includes the method of example 1 or some other example herein, further comprising: determining the RLM-RSs are to be transmitted in the second BWP, wherein the second BWP is an initial BWP of the serving cell; and processing configuration information that exclusively configures the initial BWP for transmitting the RLM-RSs of the serving cell.

Example 3 includes the method of example 2 or some other example herein, further comprising: processing a RLM-RS configuration information element (IE) that includes an initial-BWP parameter; and determining the RLM-RSs are to be transmitted in the initial BWP based on the initial-BWP parameter.

Example 4 includes the method of example 1 or some other example herein, further comprising: determining the RLM-RSs are to be transmitted in the second BWP, wherein the second BWP is further different from an initial BWP of the serving cell.

Example 5 includes the method of example 1 or some other example herein, further comprising: processing a RLM-RS configuration information element (IE) that includes an indication of a BWP index; and determining the RLM-RSs are to be transmitted in the second BWP based on the BWP index.

Example 6 includes the method of example 1 or some other example herein, further comprising: determining the RLM-RSs are to be transmitted in the active BWP and the second BWP, wherein the second BWP is an initial BWP of the serving cell.

Example 7 includes the method of example 1 or some other example herein, further comprising determining the RLM-RSs are to be transmitted in the active BWP based on a determination that the configuration status of the radio network does not explicitly configure any BWP for RLM-RS.

Example 8 includes a method comprising: storing configuration information; determining, based on the configuration information, a configuration status of a radio network that includes beam-specific bandwidth parts (BWPs): determining, based on the configuration status, an active BWP pan for data and control signaling and a measurement BWP for transmission of radio-link monitoring reference signals (RLM RSs); and measuring one or more RLM-RS received in the measurement BWP for a radio link monitoring operation.

Example 9 includes the method of example 8 or some other example herein, further comprising determining the measurement BWP comprises an initial BWP of the serving cell.

Example 10 includes the method of example 9 or some other example herein, further comprising: processing a RLM-RS configuration information element (IE) that includes an initial-BWP parameter; and determining the measurement BWP comprises the initial BWP based on the initial-BWP parameter.

Example 11 includes the method of example 8 or some other example herein, wherein the measurement BWP is different from an initial BWP of the serving cell.

Example 12 includes the method of example 8 or some other example herein, further comprising: processing a RLM-RS information element (IE) that includes an indication of a BWP index; and determining the measurement BWP based on the BWP index.

Example 13 includes the method of example 8 or some other example herein, further comprising: processing a configuration element to determine a BWP switching period; and switching the measurement BWP on based on the BWP switching period.

Example 14 includes the method of example 13 or some other example herein, wherein the configuration element is to indicate a starting slot index of the BWP switching period, a duration of the BWP switching period, a periodicity of the BWP switching period, or an index of the measurement BWP.

Example 15 includes the method of example 8 or some other example herein, further comprising, communicating with the base station concurrently with said measurement of the one or more RLM-RSs.

Example 16 includes the method of example 15 or some other example herein, further comprising communicating with the base station concurrently with said measuring of the one or more RLM RSs in the active BWP.

Example 17 includes the method of example 15 or some other example herein, further comprising communicating with the base station concurrently with said measuring of the one or more RLM RSs in the measurement BWP.

Example 18 includes a method of operating a base station, the method comprising: generating configuration information to include an indication of a bandwidth part (BWP) to be used for transmission of radio link monitoring (RLM) reference signals; transmitting the configuration information element to a user equipment; and transmitting RLM RSs in the BWP.

Example 19 includes the method of example 18 or some other example herein, wherein the configuration information further comprises an indication of a BWP switching period that includes a starting slot index of the BWP switching period, a duration of the BWP switching period, or a periodicity of the BWP switching period. Example 20 includes the method of example 19 or some other example herein, further comprising transmitting the indication of the BWP switching period in radio resource control signaling, a media access control (MAC) control element (CE), or downlink control information. Example 21 may include an apparatus comprising means to perform one or more elements of a method described in or related to any of examples 1-20, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-21), or any other method or process described herein.

Example 23 may include an apparatus comprising logic, modules, or circuitry to perform one or more elements of a method described in or related to any of examples 1-20, or any other method or process described herein.

Example 24 may include a method, technique, or process as described in or related to any of examples 1-20, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of examples 1-20, or portions thereof.

Example 26 may include a signal as described in or related to any of examples 1-20, or portions or parts thereof.

Example 27 may include a datagram, information element, packet, frame, segment, PDU, or message as described in or related to any of examples 1-20, or portions or parts thereof, or otherwise described in the present disclosure.

Example 28 may include a signal encoded with data as described in or related to any of examples 1-20, or portions or parts thereof, or otherwise described in the present disclosure.

Example 29 may include a signal encoded with a datagram, IE, packet, frame, segment, PDU, or message as described in or related to any of examples 1-20, or portions or parts thereof, or otherwise described in the present disclosure.

Example 30 may include an electromagnetic signal carrying computer-readable instructions, wherein execution of the computer-readable instructions by one or more processors is to cause the one or more processors to perform the method, techniques, or process as described in or related to any of examples 1-20, or portions thereof.

Example 31 may include a computer program comprising instructions, wherein execution of the program by a processing element is to cause the processing element to carry out the method, techniques, or process as described in or related to any of examples 1-20, or portions thereof.

Example 32 may include a signal in a wireless network as shown and described herein.

Example 33 may include a method of communicating in a wireless network as shown and described herein.

Example 34 may include a system for providing wireless communication as shown and described herein.

Example 35 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory computer-readable media having instructions that, when executed, cause processing circuitry to:
    identify an active bandwidth part (BWP) of a serving cell, the active BWP to provide resources with which the processing circuitry may use to communicate via a non-terrestrial network (NTN);
    determine, based on a configuration status of the serving cell, that radio link monitoring-reference signals (RLM-RSs) are to be transmitted in a second BWP of the serving cell, wherein the second BWP is an inactive BWP and is different from the active BWP;
    measure one or more RLM-RSs transmitted in the second BWP to perform a radio link monitoring (RLM) operation; and
    utilize the resources of the active BWP to communicate with a base station concurrent with measurement of the one or more RLM-RSs transmitted in the second BWP.

2. The one or more non-transitory computer-readable media of claim 1, wherein the second BWP is an initial BWP of the serving cell and the instructions, when executed, further cause the processing circuitry to:
    process configuration information that exclusively configures the initial BWP for transmitting the RLM-RSs of the serving cell.

3. The one or more non-transitory computer-readable media of claim 2, wherein the instructions, when executed, further cause the processing circuitry to:
    process a RLM-RS configuration information element (IE) that includes an initial BWP parameter; and
    determine the RLM-RSs are to be transmitted in the initial BWP based on the initial BWP parameter.

4. The one or more non-transitory computer-readable media of claim 1, wherein the second BWP is different from an initial BWP of the serving cell.

5. The one or more non-transitory computer-readable media of claim 1, wherein the instructions, when executed, further cause the processing circuitry to:
    process a RLM-RS configuration information element (IE) that includes an indication of a BWP index; and
    determine the RLM-RSs are to be transmitted in the second BWP based on the BWP index.

6. The one or more non-transitory computer-readable media of claim 1, wherein the instructions, when executed, further cause the processing circuitry to:
    determine the RLM-RSs are to be transmitted in the active BWP and the second BWP, wherein the second BWP is an initial BWP of the serving cell.

7. A baseband processor comprising:
    memory to store configuration information; and
    processing circuitry coupled with the memory, the processing circuitry to:
        determine, based on the configuration information, a configuration status of a non-terrestrial network;
        determine, based on the configuration status, an active bandwidth part (BWP) of a serving cell for data and control signaling and a measurement BWP of the serving cell for transmission of radio-link monitoring reference signals (RLM RSs), wherein the active BWP is different from the measurement BWP and the measurement BWP is an inactive BWP;
        measure one or more RLM-RS received in the measurement BWP for a radio link monitoring operation; and
        utilize the active BWP for data and control signaling concurrent with measurement of the one or more RLM-RSs transmitted in the measurement BWP.

8. The baseband processor of claim 7, wherein the processing circuitry is further to determine the measurement BWP comprises an initial BWP of the serving cell.

9. The baseband processor of claim 8, wherein the processing circuitry is further to:
    process a RLM-RS configuration information element (IE) that includes an initial-BWP parameter; and
    determine the measurement BWP comprises the initial BWP based on the initial-BWP parameter.

10. The baseband processor of claim 7, wherein the measurement BWP is different from an initial BWP of the serving cell.

11. The baseband processor of claim 7, wherein the processing circuitry is further to:
    process a RLM-RS information element (IE) that includes an indication of a BWP index; and
    determine the measurement BWP based on the BWP index.

12. The baseband processor of claim 7, wherein the processing circuitry is further to:
    process a configuration element to determine a BWP switching period; and
    switch the measurement BWP based on the BWP switching period.

13. The baseband processor of claim 12, wherein the configuration element is to indicate a starting slot index of the BWP switching period, a duration of the BWP switching period, a periodicity of the BWP switching period, or an index of the measurement BWP.

14. The baseband processor of claim 7, wherein the processing circuitry is further to:
    communicate with a base station concurrently with measurement of the one or more RLM-RSs.

15. The baseband processor of claim 14, wherein the processing circuitry is further to:
    measure at least one RLM-RS received in the active BWP.

16. A method comprising:
    generating configuration information to include an indication of a bandwidth part (BWP) to be used for transmission of radio link monitoring-reference signals (RLM-RSs) in a serving cell of a non-terrestrial network (NTN), wherein the BWP is an inactive BWP and is different from an active BWP of the serving cell;
    transmitting the configuration information to a user equipment (UE) of the serving cell;

transmitting RLM-RSs in the BWP; and communicating with the UE using the active BWP concurrently with transmitting the RLM-RSs.

17. The method of claim 16, wherein the configuration information further comprises an indication of a BWP switching period that includes a starting slot index of the BWP switching period, a duration of the BWP switching period, or a periodicity of the BWP switching period.

18. The method of claim 17, further comprising:

transmitting the indication of the BWP switching period in radio resource control signaling, a media access control (MAC) control element (CE), or downlink control information.

* * * * *